US012221323B2

(12) United States Patent
Babu

(10) Patent No.: US 12,221,323 B2
(45) Date of Patent: Feb. 11, 2025

(54) STRUCTURE FOR FRAME PIECES OF A PNEUMATIC VACUUM ELEVATOR

(71) Applicant: Killakathu Ramanathan Babu, Tamilnadu (IN)

(72) Inventor: Killakathu Ramanathan Babu, Tamilnadu (IN)

(73) Assignee: Killalathu Ramanathan Babu (IN)

( * ) Notice: Subject to any disclaimer, the term of this patent is extended or adjusted under 35 U.S.C. 154(b) by 0 days.

(21) Appl. No.: 17/928,634

(22) PCT Filed: Oct. 5, 2021

(86) PCT No.: PCT/IB2021/059113
§ 371 (c)(1),
(2) Date: Nov. 30, 2022

(87) PCT Pub. No.: WO2023/021321
PCT Pub. Date: Feb. 23, 2023

(65) Prior Publication Data

US 2024/0300780 A1 Sep. 12, 2024

(30) Foreign Application Priority Data

Aug. 17, 2021 (IN) ............................. 202141037267

(51) Int. Cl.
*B66B 9/04* (2006.01)
*B66B 11/00* (2006.01)

(52) U.S. Cl.
CPC ............ *B66B 9/04* (2013.01); *B66B 11/0005* (2013.01)

(58) Field of Classification Search
CPC ....... B66B 7/024; B66B 7/022; B66B 11/005; B66B 9/04
See application file for complete search history.

(56) References Cited

U.S. PATENT DOCUMENTS 5,447,211 A * 9/1995 Sors .......................... B66B 9/04 187/277
11,518,653 B2 * 12/2022 De Ledebur ........ B66B 11/0206

FOREIGN PATENT DOCUMENTS

CN 203199847 U 9/2013
CN 103863918 A * 6/2014
CN 104401851 A * 3/2015
(Continued)

OTHER PUBLICATIONS

Machine Translation of CN 103863918 to Huang.*

*Primary Examiner* — Diem M Tran
(74) *Attorney, Agent, or Firm* — Jason C. Cameron

(57) ABSTRACT

A structure for frame pieces of a pneumatic vacuum elevator is disclosed. The structure includes at least two horizontal arc pieces 30 and at least two vertical pieces 40 including a first arc end and a second arc end. Each of the first arc end and the second arc end include an angled cut profile. Each of the first arc end and the second arc end are adapted to receive a first coupling piece 100 at the angled cut profile. The first coupling piece 100 includes at least two holes 110. The at least two holes 110 are adapted to mechanically couple the at least two horizontal arc pieces 30 with the respective at least two vertical pieces 40 using a screw-fixing mechanism, upon receiving the respective at least two vertical pieces 40 at the angled cut profile. The at least two holes 110 are positioned at a first predefined position on the first coupling piece 100.

9 Claims, 6 Drawing Sheets

(56) References Cited

FOREIGN PATENT DOCUMENTS

| | | | | | |
|---|---|---|---|---|---|
| CN | 104401851 B | | 2/2017 | | |
| CN | 104787645 B | * | 6/2018 | ............... | B66B 7/00 |

* cited by examiner

STRUCTURE FOR FRAME PIECES OF A PNEUMATIC VACUUM ELEVATOR

CROSS-REFERENCE TO RELATED APPLICATION

This application claims priority from a Patent application filed in India having Patent Application No. 202141037267, filed on Aug. 17, 2021, and titled "A STRUCTURE FOR FRAME PIECES OF A PNEUMATIC VACUUM ELEVATOR" and a PCT Application No. PCT/IB2021/059113 filed on Oct. 5, 2021, and titled "A STRUCTURE FOR FRAME PIECES OF A PNEUMATIC VACUUM ELEVATOR".

FIELD OF INVENTION

Embodiments of a present disclosure relate to a frame of a pneumatic vacuum elevator, and more particularly to a structure for one or more frame pieces of the pneumatic vacuum elevator.

BACKGROUND

An elevator is basically a platform or compartment housed in a shaft for raising and lowering people or things to different levels. Different types of elevators are a hydraulic elevator, a traction elevator, a machine-room-less elevator, a vacuum pneumatic elevator, a shaftless elevator, and the like. Basically, different elevators use different functioning principles for their functionality. Also, conventionally, different elevators possess different types of frames that are used to provide support and sturdiness to the elevator.

From all of the different types of the elevators, the vacuum pneumatic elevator is the one which uses air pressure to cause the motion of a cabin within a thoroughfare or tubular cylinder that uses the air within it as a working fluid upon the confines of the cabin. Pneumatic vacuum elevators are typically used in countervailing weights in order to facilitate the cabin moving up and down between various layers or floors at various heights inside the vertical passageways of office buildings, hospitals, factories and similar structures.

Pneumatic vacuum elevators are provided with the frame. However, such frame makes a structure of the pneumatic vacuum elevators complex, thereby making a process of construction or assembling of the pneumatic vacuum elevators more complicated and time-consuming. Also, such frame requires high maintenance because of the complexity of the structure, thereby adding a huge maintenance cost. Further, such a frame adds more weight to the pneumatic vacuum elevators, thereby making the pneumatic vacuum elevators heavy and difficult to manage. Moreover, the complex structure of such frame and the heavyweight makes the pneumatic vacuum elevators consume more energy for proper functioning.

Hence, there is a need for an improved structure for one or more frame pieces of an elevator which addresses the aforementioned issues.

BRIEF DESCRIPTION

In accordance with one embodiment of the disclosure, a structure for one or more frame pieces of a pneumatic vacuum elevator is provided. The structure includes at least two horizontal arc pieces and at least two vertical pieces. Each of the at least two horizontal arc pieces includes a first arc end and a second arc end. Each of the first arc end and the second arc end include an angled cut profile. Each of the first arc end and the second arc end are adapted to receive a first coupling piece at the angled cut profile. The first coupling piece includes at least two holes. The at least two holes are adapted to mechanically couple the at least two horizontal arc pieces with the respective at least two vertical pieces using a screw-fixing mechanism, upon receiving the respective at least two vertical pieces at the angled cut profile. The at least two holes are positioned at a first predefined position on the first coupling piece.

In accordance with another embodiment of the disclosure, a pneumatic vacuum elevator with the structure for one or more frame pieces is provided. The pneumatic vacuum elevator includes an elevator cabin adapted to carry a passenger for transiting across one or more floors of a building. The pneumatic vacuum elevator also includes an external cylinder positioned concentrically to the elevator cabin externally. The external cylinder includes an elevator door adapted to allow entry and exit of the passenger corresponding to the elevator cabin. Further, the pneumatic vacuum elevator also includes the structure for the one or more frame pieces mechanically coupled to a covering sheet of at least one of the elevator cabin and the external cylinder. The structure includes at least two horizontal arc pieces and at least two vertical pieces. Each of the at least two horizontal arc pieces includes a first arc end and a second arc end. Each of the first arc end and the second arc end includes an angled cut profile. Each of the first arc end and the second arc end are adapted to receive a first coupling piece at the angled cut profile. The first coupling piece includes at least two holes adapted to mechanically couple the at least two horizontal arc pieces with the respective at least two vertical pieces using a screw-fixing mechanism, upon receiving the respective at least two vertical pieces at the angled cut profile. The at least two holes are positioned at a first predefined position on the first coupling piece.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 2 (*b*) is a schematic representation of an exemplary embodiment of an isometric of the at least two horizontal arc pieces of the structure of FIG. 1 in accordance with an embodiment of the present disclosure:

Figure 1:
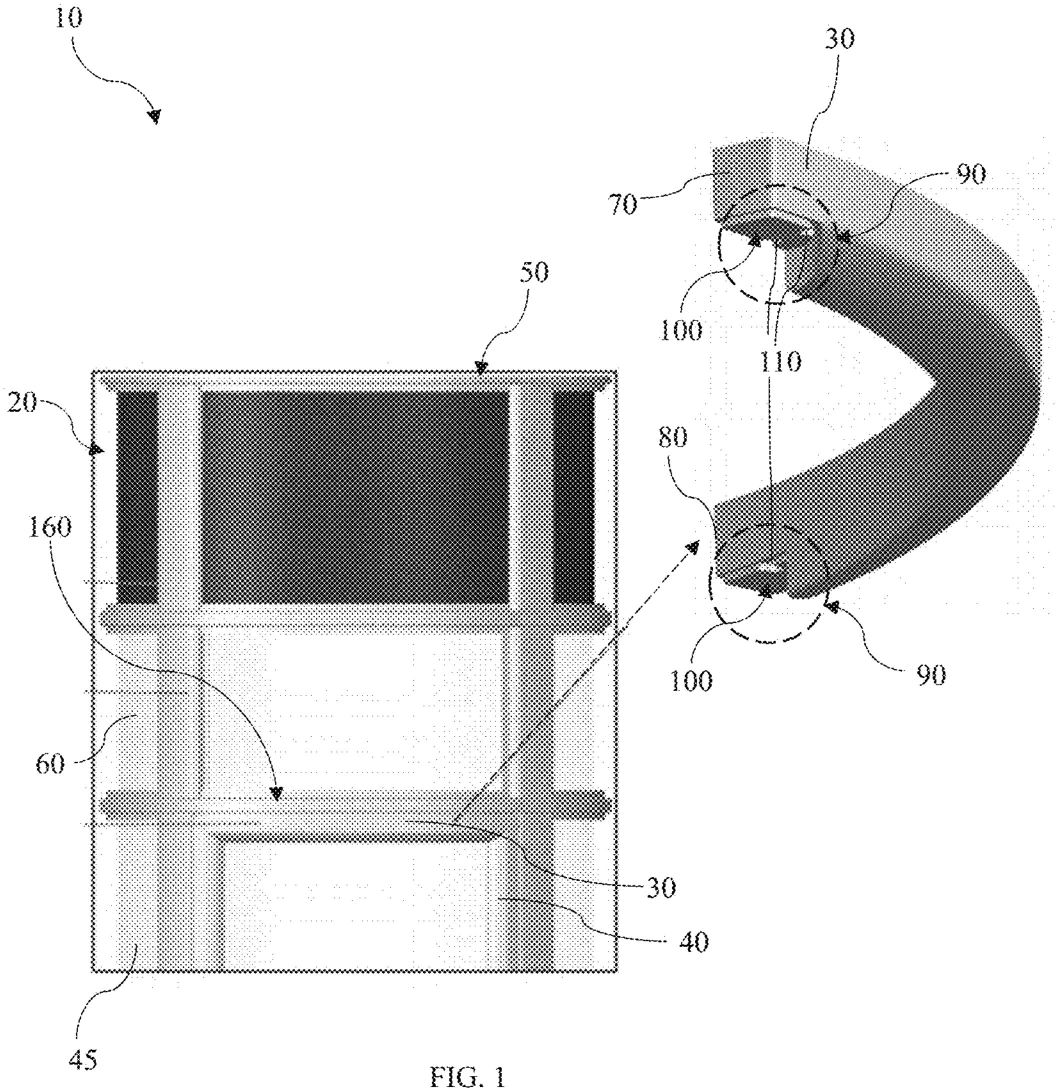
FIG. 1 is a schematic representation of a front view of a structure for one or more frame pieces of a pneumatic vacuum elevator with an isometric view for at least two horizontal arc pieces of the one or more frame pieces in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms “comprises”, “comprising”, or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by “comprises . . . a” does not, without more constraints, preclude the existence of other devices, sub-systems, elements, structures, components, additional devices, additional sub-systems, additional elements, additional structures or additional components. Appearances of the phrase “in an embodiment”, “in another embodiment” and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms “a”. “an”, and “the” include plural references unless the context clearly dictates otherwise.

Embodiments of the present disclosure relate to a structure for one or more frame pieces of a pneumatic vacuum elevator. As used herein, the term “frame” refers to a rigid structure that surrounds something such as a picture, door, windowpane, the like. The frame may include the one or more frame pieces attached with each other to form the frame. In one embodiment, the one or more frame pieces may include one or more horizontal arc pieces, one or more vertical pieces, one or more slant pieces, one or more arced pieces, or the like. Further, as used herein, the term “pneumatic vacuum elevator” is defined as an elevator which uses air pressure to cause the motion of a cabin within a thoroughfare or tubular cylinder that uses the air within it as a working fluid upon the confines of the cabin. Furthermore, the structure described hereafter in FIG. 1 is the structure for the one or more frame pieces of the pneumatic vacuum elevator.

FIG. 1 is a schematic representation of a front view of a structure 10 for one or more frame pieces of a pneumatic vacuum elevator 20 with an isometric view for at least two horizontal arc pieces 30 of the one or more frame pieces in accordance with an embodiment of the present disclosure. The structure 10 includes at least two horizontal arc pieces 30 and at least two vertical pieces 40. Basically, in an embodiment, the one or more frame pieces may include the at least two horizontal arc pieces 30 and the at least two vertical pieces 40. Further, in an embodiment, the structure 10 for each of the at least two horizontal arc pieces 30 and the at least two vertical pieces 40 may be disclosed in the present disclosure.

Figure 5:
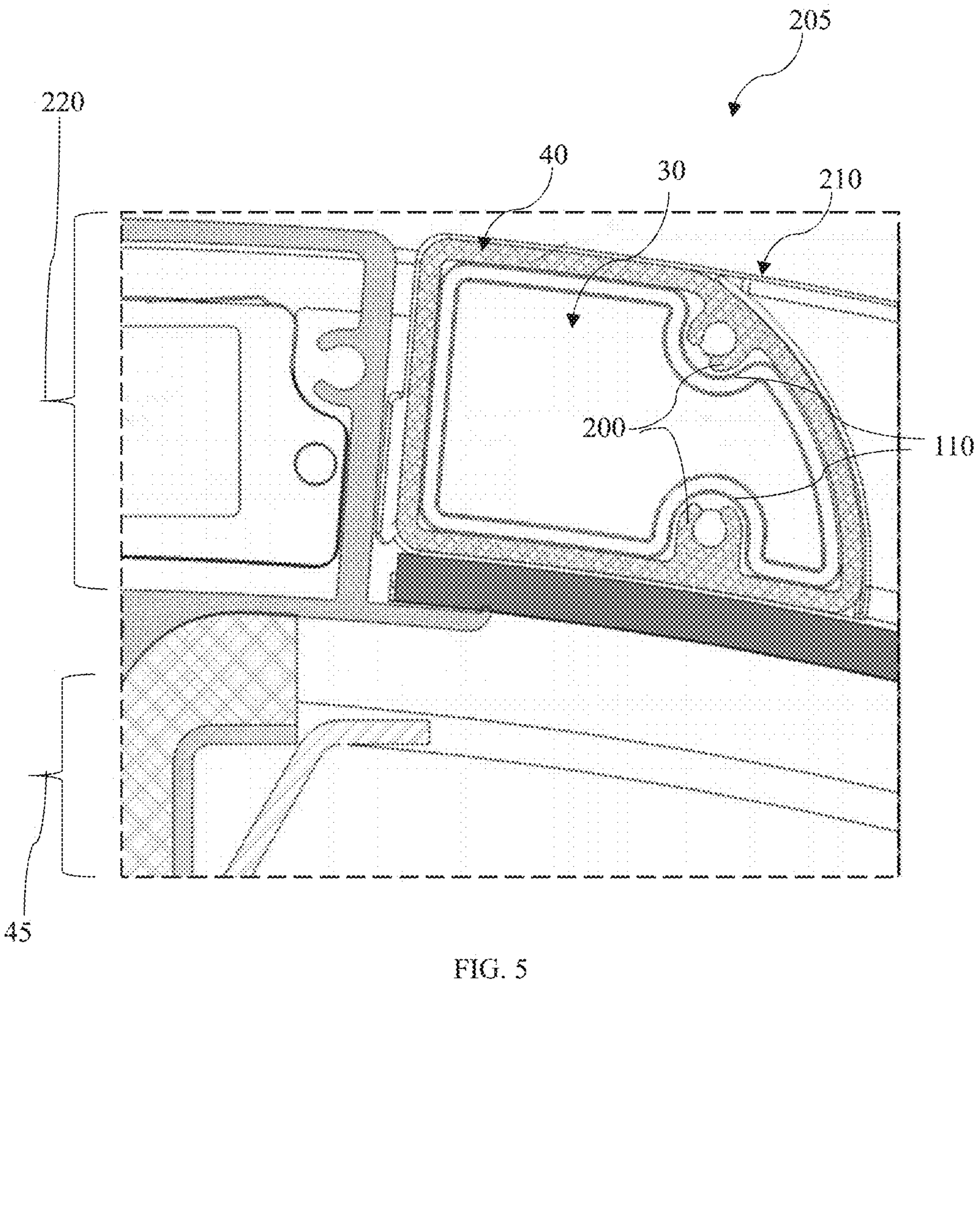
FIG. 5 is a schematic representation of an exemplary embodiment of a cross-section view of an assembly of the at least two horizontal arc pieces of the structure of FIG. 1 with the at least two vertical pieces of the structure of FIG. 3 in an elevator door of the elevator in accordance with an embodiment of the present disclosure.

In one embodiment, the pneumatic vacuum elevator 20 may include an elevator cabin 45 surrounded by an external cylinder (as shown in FIG. 5) with a predefined gap between the elevator cabin 45 and the external cylinder. Further, the external cylinder may include an elevator door (as shown in FIG. 5). Also, in an embodiment, the one or more frame pieces may be mechanically coupled with each other to obtain a sturdy frame 50, wherein the sturdy frame 50 may be used to provide support for the pneumatic vacuum elevator 20. In an embodiment, the pneumatic vacuum elevator 20 may also include a covering sheet 60 forming a complete body of the elevator cabin 45 and the external cylinder.

Further, each of the at least two horizontal arc pieces 30 includes a first arc end 70 and a second arc end 80. Each of the first are end 70 and the second arc end 80 include an angled cut profile 90. Each of the first arc end 70 and the second arc end 80 are adapted to receive a first coupling piece 100 at the angled cut profile 90. The first coupling piece 100 includes at least two holes 110. The at least two holes 110 are adapted to mechanically couple the at least two horizontal arc pieces 30 with the respective at least two vertical pieces 40 using a screw-fixing mechanism, upon receiving the respective at least two vertical pieces 40 at the angled cut profile 90. The at least two holes 110 are positioned at a first predefined position on the first coupling piece 100. As used herein, the term “screw-fixing mechanism” is defined as a mechanism that involves fixing one or more parts with each other using one or more mechanical coupling means. In one embodiment, the one or more mechanical coupling means may include at least one of one or more screws, one or more bolts, one or more nuts, and the like.

In one exemplary embodiment, the at least two horizontal arc pieces 30 may be manufactured by an aluminum die casting mechanism. As used herein, the term “aluminum die casting mechanism” is defined as a manufacturing process that produces accurately, defined, smooth, and textured-surfaced metal parts and is accomplished by forcing molten metals into a mold form due to high-pressure systems.

Figure 2:
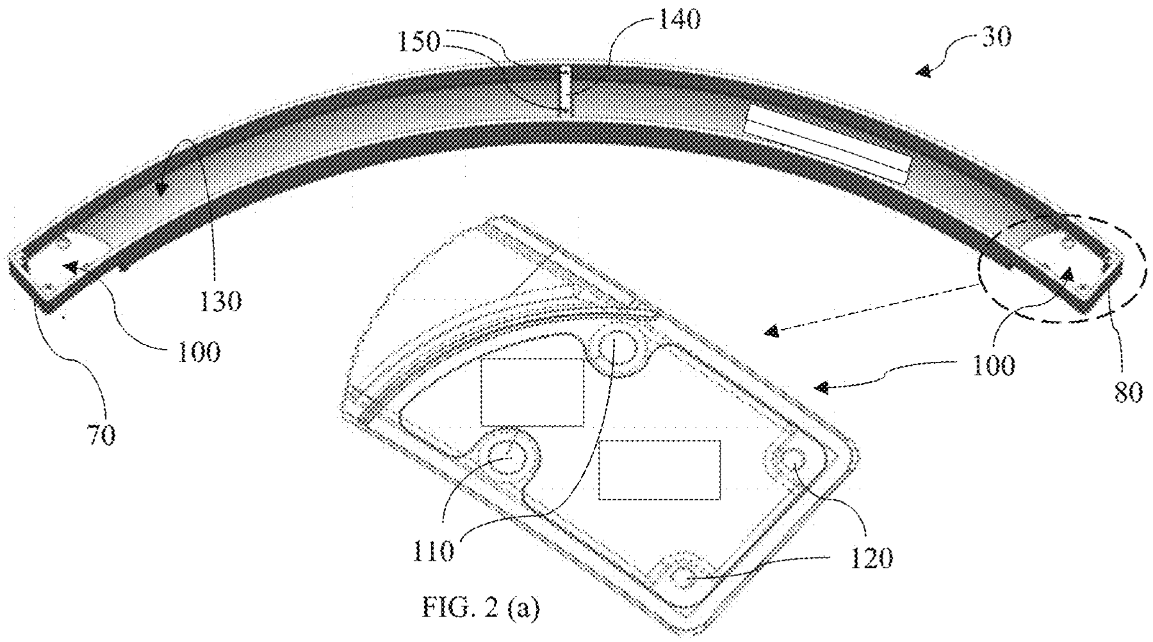
FIG. 2 (*a*) is a schematic representation of an exemplary embodiment of a top view of the at least two horizontal arc pieces of the structure of FIG. 1 with a detailed view of a first coupling piece in accordance with an embodiment of the present disclosure.
Figure 2:
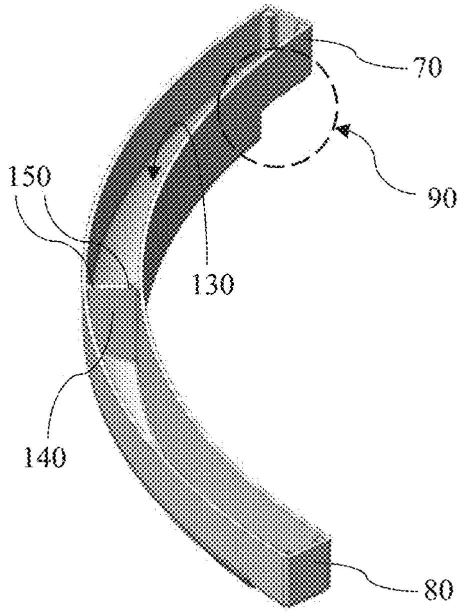

FIG. 2 (*a*) is a schematic representation of an exemplary embodiment of a top view of the at least two horizontal arc pieces 30 of the structure 10 of FIG. 1 with a detailed view of the first coupling piece 100 in accordance with an embodiment of the present disclosure. In one embodiment, the at least two horizontal arc pieces 30 may be hollow, and hence the top view may clearly display an internal view or the detailed view of the first coupling piece 100. In one embodiment, the first coupling piece 100 may be mechanically coupled to the angled cut profile 90 of the first arc end 70 and the second are end 80 via a predefined coupling means.

In one exemplary embodiment, the predefined coupling means may include at least one of using a glue, using the one or more mechanical coupling means, and the like. Therefore, in an embodiment, the first coupling piece 100 may also include at least two cornered holes 120. In one embodiment, the at least two cornered holes 120 may be adapted to mechanically couple the at least two horizontal arc pieces 30 with the respective at least two vertical pieces 40 using the screw-fixing mechanism, upon receiving the respective at least two vertical pieces 40 at the angled cut profile 90. In an alternative embodiment, the at least two cornered holes 120 may be adapted to mechanically couple the first coupling piece 100 with the at least two horizontal arc pieces 30 at the angled cut profile 90 via the predefined coupling means.

In addition, in an embodiment, each of the at least two horizontal arc pieces 30 may have a rectangular shape with at least one demi bullnose edge. In one exemplary embodiment, the at least two horizontal arc pieces 30 may have the rectangular shape with at least one demi bullnose edge in a cross-sectional view of the at least two horizontal arc pieces 30.

FIG. 2 (*b*) is a schematic representation of an exemplary embodiment of an isometric of the at least two horizontal arc pieces 30 of the structure 10 of FIG. 1 in accordance with an embodiment of the present disclosure. In one exemplary embodiment, the at least two horizontal arc pieces 30 may include an inner chamber 130. In one embodiment, the inner chamber 130 may be hollow. In such embodiment, the inner chamber 130 may include at least one second coupling piece 140. In one exemplary embodiment, the at least one second coupling piece 140 may be attached to the inner chamber 130 of the at least two horizontal arc pieces 30 via the predefined coupling means.

In one embodiment, the at least one second coupling piece 140 may include at least two holes 150 for mechanically coupling the at least two horizontal arc pieces 30 with a support piece (as shown in FIG. 1) 160 attached to the pneumatic vacuum elevator 20 using the screw-fixing mechanism. In an embodiment, the support piece 160 may be a part of the sturdy frame 50.

Figure 3:
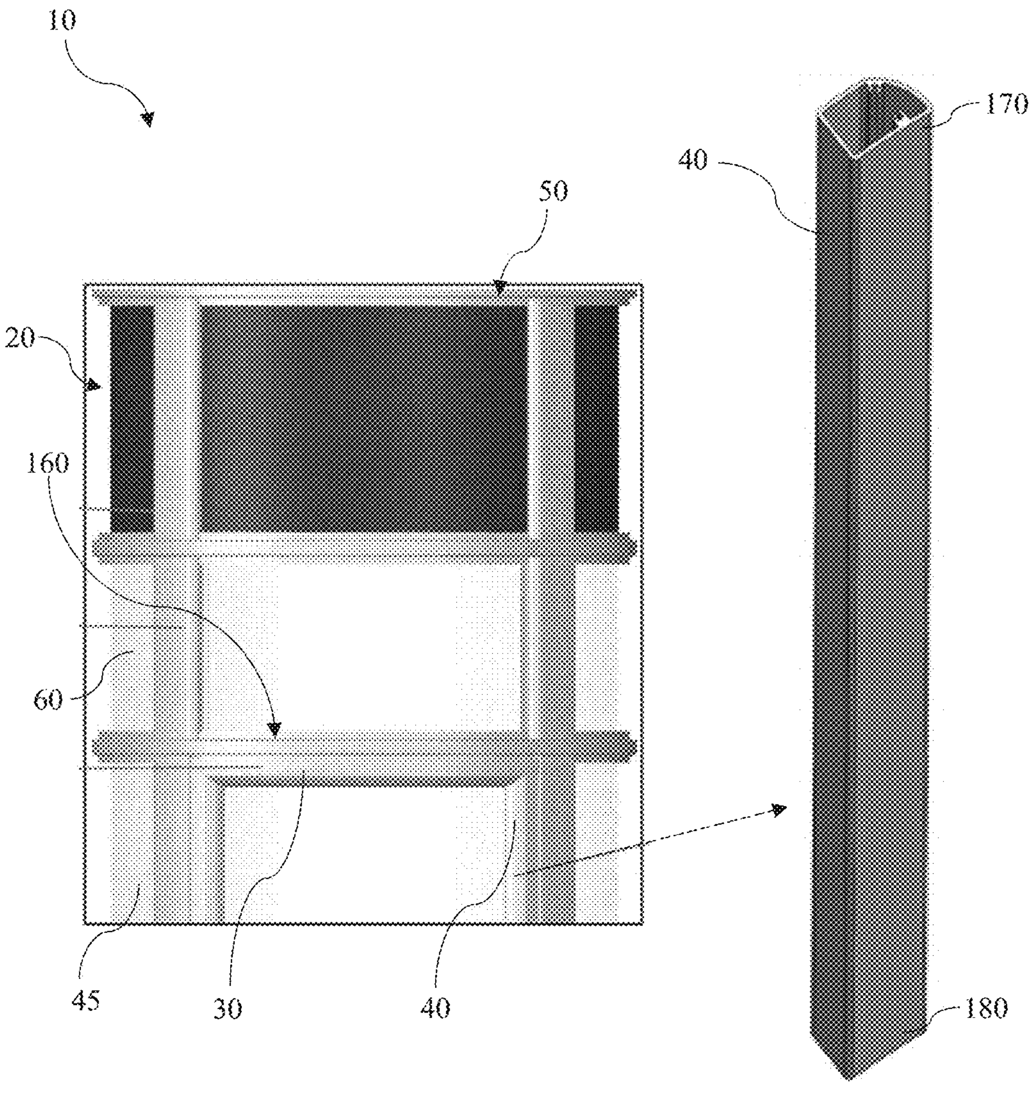
FIG. 3 is a schematic representation of an exemplary embodiment of a front view of the structure for one or more frame pieces of a pneumatic vacuum elevator of FIG. 1 with an isometric view for at least two vertical pieces of the one or more frame pieces in accordance with an embodiment of the present disclosure.

FIG. 3 is a schematic representation of an exemplary embodiment of a front view of the structure 10 for the one or more frame pieces of the pneumatic vacuum elevator 20 of FIG. 1 with an isometric view for at least two vertical pieces 40 of the one or more frame pieces in accordance with an embodiment of the present disclosure. In one exemplary embodiment, the at least two vertical pieces 40 may include a first vertical piece end 170 and a second vertical piece end 180. In such embodiment, each of the at least two vertical pieces 40 may be mechanically coupled to the respective at least two horizontal arc pieces 30 via the first vertical piece end 170 or the second vertical piece end 180.

Further, in an embodiment, the at least two vertical pieces 40 may be hollow.

Moreover, in one embodiment, each of the at least two vertical pieces 40 may be manufactured by an aluminum extrusion mechanism. As used herein, the term "aluminum extrusion mechanism" is defined as a process by which aluminum alloy material is forced through a die with a specific cross-sectional profile.

Figure 4:
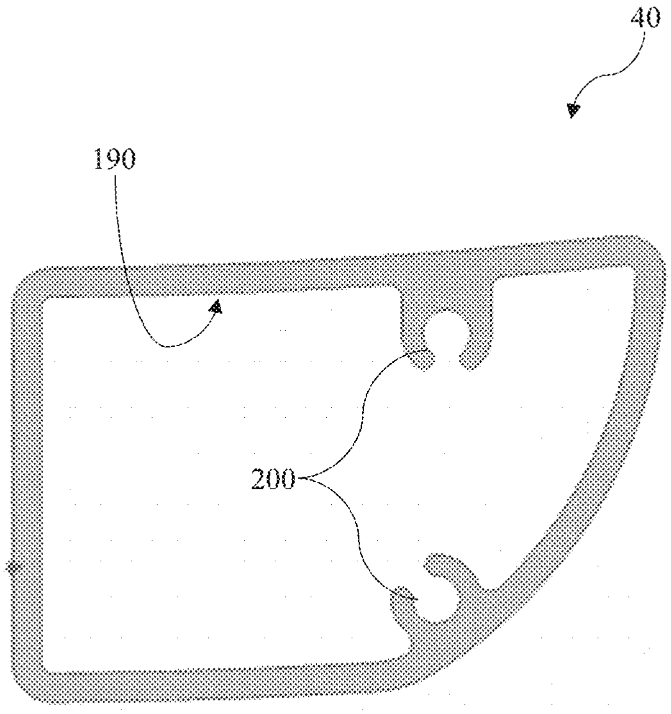
FIG. 4 is a schematic representation of an exemplary embodiment of a cross-section view of the at least two vertical pieces of the structure of FIG. 3 in accordance with an embodiment of the present disclosure.

FIG. 4 is a schematic representation of an exemplary embodiment of a cross-section view of the at least two vertical pieces 40 of the structure 10 of FIG. 3 in accordance with an embodiment of the present disclosure. In one embodiment, each of the at least two vertical pieces 40 may have a rectangular shape with at least one demi bullnose edge. In one exemplary embodiment, the at least two vertical pieces 40 may have the rectangular shape with at least one demi bullnose edge in the cross-section view of the at least two vertical pieces 40.

In addition, in an embodiment, each of the at least two vertical pieces 40 may include an inner surface 190 including at least two grooved rib profiles 200. The at least two grooved rib profiles 200 may be adapted to mechanically couple the at least two vertical pieces 40 with the respective at least two horizontal are pieces 30 using the screw-fixing mechanism, upon placing the first vertical piece end 170 of the at least two vertical pieces 40 at the angled cut profile 90 of the respective at least two horizontal arc pieces 30.

FIG. 5 is a schematic representation of an exemplary embodiment of a cross-section view of an assembly 205 of the at least two horizontal arc pieces 30 of the structure 10 of FIG. 1 with the at least two vertical pieces 40 of the structure 10 of FIG. 3 in the elevator door 210 of the pneumatic vacuum elevator 20 in accordance with an embodiment of the present disclosure. In an embodiment, the elevator door 210 is disposed in the external cylinder 220 to open and close the elevator cabin 45. In one embodiment, the at least two grooved rib profiles 200 may be positioned at a second predefined position on the inner surface 190, wherein the second predefined position may be in correspondence with the first predefined position. Basically, the second predefined position of the at least two grooved rib profiles 200 may have to be such that the second predefined position matches with the first predefined position of the at least two holes 110 on the first coupling piece 100. Therefore, the at least two grooved rib profiles 200 of the at least two vertical pieces 40 may be placed exactly on top of the at least two holes 110 on the first coupling piece 100 of the respective at least two horizontal arc pieces 30. Further, upon placement, the at least two vertical pieces 40 may be mechanically coupled with the respective at least two horizontal arc pieces 30 using the screw-fixing mechanism.

Figure 6:
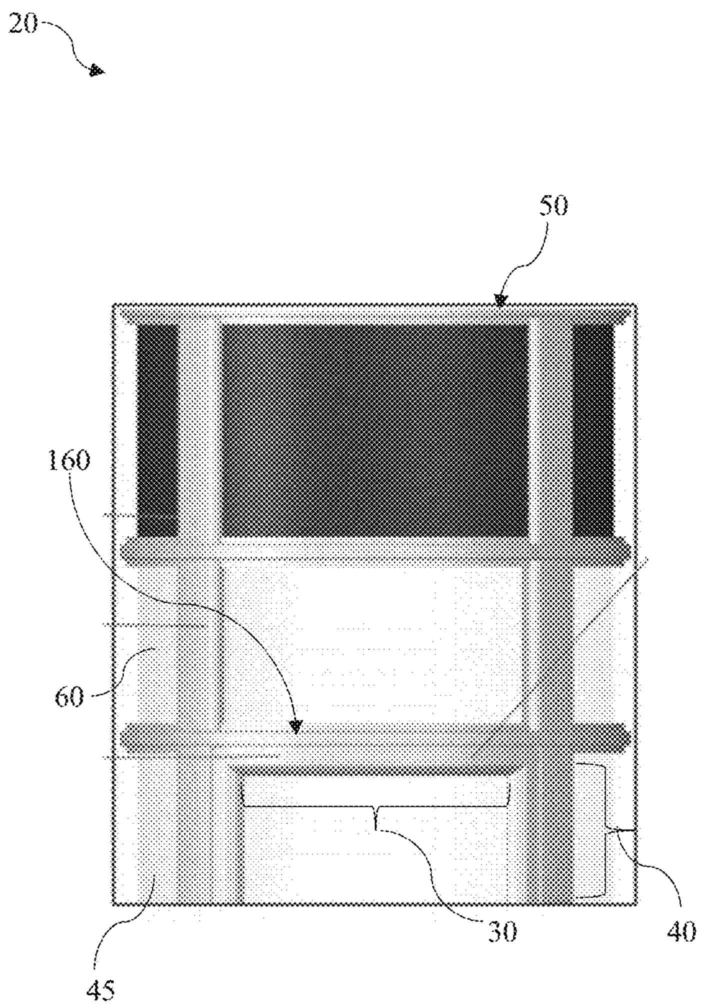
FIG. 6 is a schematic representation of an embodiment of a pneumatic vacuum elevator with the structure for the one or more frame pieces of FIG. 1 in accordance with an embodiment of the present disclosure.

FIG. 6 is a schematic representation of an embodiment of the pneumatic vacuum elevator 20 with the structure 10 for the one or more frame pieces of FIG. 1 in accordance with an embodiment of the present disclosure. The pneumatic vacuum elevator 20 includes the elevator cabin 45 adapted to carry a passenger for transiting across one or more floors of a building. The pneumatic vacuum elevator 20 also includes the external cylinder 220 (not shown in FIG. 6), positioned concentrically to the elevator cabin 45 externally. The external cylinder 220 includes the elevator door 210 (not shown in FIG. 6) adapted to allow entry and exit of the passenger corresponding to the elevator cabin 45.

Further, the pneumatic vacuum elevator 20 also includes the structure 10 for the one or more frame pieces mechanically coupled to the covering sheet 60 of at least one of the elevator cabin 45 and the external cylinder 220. In one embodiment, the covering sheet 60 may be transparent, translucent, colored, or the like. In one exemplary embodiment, the covering sheet 60 may include a polycarbonate sheet. The structure 10 includes the at least two horizontal arc pieces 30 and the at least two vertical pieces 40. In one embodiment, the at least two horizontal arc pieces 30 and the at least two vertical pieces 40 may be mechanically coupled with each other to obtain the sturdy frame 50. Thus, in an embodiment, the sturdy frame 50 may provide support to the covering sheet 60 to obtain the pneumatic vacuum elevator 20.

Furthermore, each of the at least two horizontal arc pieces 30 includes the first arc end 70 and the second arc end 80. Each of the first are end 70 and the second arc end 80 includes the angled cut profile 90. Each of the first arc end 70 and the second arc end 80 are adapted to receive the first coupling piece 100 at the angled cut profile 90. The first coupling piece 100 includes the at least two holes 110 adapted to mechanically couple the at least two horizontal arc pieces 30 with the respective at least two vertical pieces 40 using the screw-fixing mechanism, upon receiving the respective at least two vertical pieces 40 at the angled cut profile 90. The at least two holes 110 are positioned at the first predefined position on the first coupling piece 100.

Various embodiments of the present disclosure enable construction or assembling of the pneumatic vacuum elevator easier, as the construction of the frame by bringing the one or more frame pieces together is easy because of the structure of the corresponding one or more frame pieces. Also, the structure requires low maintenance, as irregular shaping, welding process, and manual cutting process is avoided because of usage of the aluminum die casting mechanism and the aluminum extrusion mechanism. Also, the structure enhances an aesthetic view of the pneumatic vacuum elevator, thereby making the structure a most preferable one.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A structure (10) for one or more frame pieces of a pneumatic vacuum elevator (20) comprising:

at least two horizontal arc pieces (30), wherein each of the at least two horizontal arc pieces (30) comprises a rectangular shape with at least one demi bullnose edge; and at least two vertical pieces (40), wherein each of the at least two horizontal arc pieces (30) comprises:

a first arc end (70); and a second arc end (80), wherein each of the first arc end (70) and the second arc end (80) comprises an angled cut profile (90), wherein each of the first arc end (70) and the second arc end (80) are adapted to receive a first coupling piece (100) at the angled cut profile (90), wherein the first coupling piece (100) comprises at least two holes (110) adapted to mechanically couple the at least two horizontal arc pieces (30) with the respective at least two vertical pieces (40) using a screw-fixing mechanism, upon receiving the respective at least two vertical pieces (40) at the angled cut profile (90), wherein the at least two holes (110) are positioned at a first predefined position on the first coupling piece (100).

2. The structure (10) as claimed in claim 1, wherein the at least two horizontal arc pieces (30) are manufactured by an aluminum die casting mechanism.

3. The structure (10) as claimed in claim 1, wherein the at least two vertical pieces (40) are manufactured by an aluminum extrusion mechanism.

4. The structure (10) as claimed in claim 1, wherein the at least two horizontal arc pieces (30) comprises an inner chamber (130), wherein the inner chamber (130) comprises at least one second coupling piece (140) comprising at least two holes (150) for mechanically coupling the at least two horizontal arc pieces (30) with a support piece (160) attached to the pneumatic vacuum elevator (20) using the screw-fixing mechanism.

5. The structure (10) as claimed in claim 1, wherein each of the at least two vertical pieces (40) comprises a rectangular shape with at least one demi bullnose edge.

6. The structure (10) as claimed in claim 1, wherein each of the at least two vertical pieces (40) comprises an inner surface (190) comprising at least two grooved rib profiles (200).

7. The structure (10) as claimed in claim 6, wherein the at least two grooved rib profiles (200) are adapted to mechanically couple the at least two vertical pieces (40) with the respective at least two horizontal arc pieces (30) using the screw-fixing mechanism, upon placing a first vertical piece end (170) of the at least two vertical pieces (40) at the angled cut profile (90) of the respective at least two horizontal arc pieces (30).

8. The structure (10) as claimed in claim 6, wherein the at least two grooved rib profiles (200) are positioned at a second predefined position on the inner surface (190), wherein the second predefined position is in correspondence with the first predefined position.

9. A pneumatic vacuum elevator (20) with a structure (10) for one or more frame pieces comprising:

an elevator cabin (45) adapted to carry a passenger for transiting across one or more floors of a building;

an external cylinder (220) positioned concentrically to the elevator cabin (45) externally, wherein the external cylinder (220) comprises an elevator door (210) adapted to allow entry and exit of the passenger corresponding to the elevator cabin (45); and the structure (10) for the one or more frame pieces mechanically coupled to a covering sheet (60) of at least one of the elevator cabin (45) and the external cylinder (220), wherein the structure (10) comprises at least two horizontal arc pieces (30) and at least two vertical pieces (40)), wherein each of the at least two horizontal arc pieces (30) comprises a rectangular shape with at least one demi bullnose edge, wherein each of the at least two horizontal arc pieces (30) comprises:

a first arc end (70); and a second arc end (80), wherein each of the first arc end (70) and the second arc end (80) comprises an angled cut profile (90), wherein each of the first arc end (70) and the second arc end (80) are adapted to receive a first coupling piece (100) at the angled cut profile (90), wherein the first coupling piece (100) comprises at least two holes (110) adapted to mechanically couple the at least two horizontal arc pieces (30) with the respective at least two vertical pieces (40) using a screw-fixing mechanism, upon receiving the respective at least two vertical pieces (40) at the angled cut profile (90), wherein the at least two holes (110) are positioned at a first predefined position on the first coupling piece (100).

* * * * *